(12) United States Patent
Chapman et al.

(10) Patent No.: US 8,924,822 B2
(45) Date of Patent: Dec. 30, 2014

(54) METHOD OF RE-TRANSMITTING AN ORIGINAL FRAME

(75) Inventors: Thomas Malcolm Chapman, Southampton (GB); Juergen Michel, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1759 days.

(21) Appl. No.: 11/919,254

(22) PCT Filed: Apr. 10, 2006

(86) PCT No.: PCT/GB2006/001320
§ 371 (c)(1),
(2), (4) Date: Oct. 26, 2009

(87) PCT Pub. No.: WO2006/114568
PCT Pub. Date: Nov. 2, 2006

(65) Prior Publication Data
US 2010/0050033 A1   Feb. 25, 2010

(30) Foreign Application Priority Data
Apr. 25, 2005   (GB) .................. 0508272.2

(51) Int. Cl.
*H03M 13/00* (2006.01)
*H04W 52/32* (2009.01)
*H04W 52/44* (2009.01)

(52) U.S. Cl.
CPC ........... *H04W 52/325* (2013.01); *H04W 52/44* (2013.01)
USPC .......................................... 714/776; 714/749

(58) Field of Classification Search
USPC .................................. 714/776, 749
See application file for complete search history.

(56) References Cited

U.S. PATENT DOCUMENTS

| | | | |
|---|---|---|---|
| 6,735,620 B1 * | 5/2004 | Blackmore et al. ........... | 709/212 |
| 7,155,236 B2 * | 12/2006 | Chen et al. .................... | 455/454 |
| 7,660,282 B2 * | 2/2010 | Sarkar ........................... | 370/331 |
| 2002/0114343 A1 * | 8/2002 | Lioy et al. ..................... | 370/442 |
| 2003/0039229 A1 * | 2/2003 | Ostman ......................... | 370/335 |
| 2004/0088634 A1 * | 5/2004 | Kim et al. ..................... | 714/752 |
| 2004/0137931 A1 | 7/2004 | Sarkar et al. | |
| 2005/0047344 A1 * | 3/2005 | Seol .............................. | 370/235 |
| 2005/0058154 A1 | 3/2005 | Lee et al. | |

FOREIGN PATENT DOCUMENTS

| | | |
|---|---|---|
| RU | 2 216 867 C2 | 11/2003 |
| WO | 01/80477 A1 | 10/2001 |
| WO | 03/032564 A2 | 4/2003 |
| WO | 03/058873 A1 | 7/2003 |
| WO | 03/092213 A1 | 11/2003 |

OTHER PUBLICATIONS

Decision on Grant for Russian Patent Application No. 2007143553; mailed Jun. 17, 2010.

(Continued)

*Primary Examiner* — M. Mujtaba K Chaudry

(57) ABSTRACT

Data bits are mapped to a lower number of slots than the number of slots available for a retransmission frame and control channels are transmitted in all available slots of the retransmission frame. The number of available slots in the retransmission frame is greater than the number of available slots in the original frame.

14 Claims, 1 Drawing Sheet

(56) References Cited

OTHER PUBLICATIONS

Universal Mobile Telecommunications Systems (UMTS); Multiplexing and Channel Coding (FDD); ETSI TS 125 212 V6.4.0 (3GPP TS 25.212 version 6.4.0 Release 6); Mar. 2005; pp. 1-5, 54-57.
Universal Mobile Telecommunications Systems (UMTS); Physical channels and mapping of transport channels onto physical channels (FDD); ETSI TS 125 211 V6.4.0 (3GPP TS 25.211 version 6.4.0 Release 6); Mar. 2005; pp. 1-4, 14, 15, 22-25.
HS-DPCCH and compressed mode; Feb. 2002; 3GPP TSG RAN WG1#34; pp. 1-2.
International Search Report for Application No. PCT/GB2006/001320; mailed Aug. 2, 2006.
United Kingdom Search Report for Application No. GB0508272.2; dated Oct. 6, 2005.

* cited by examiner

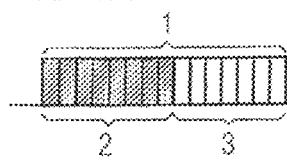
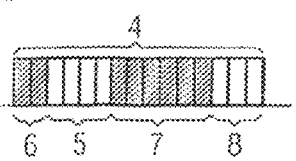
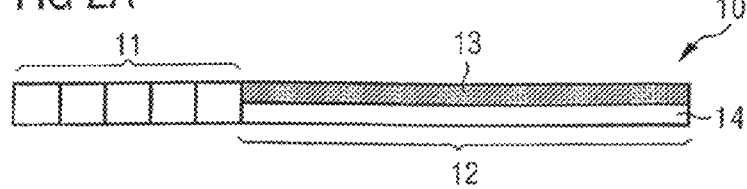
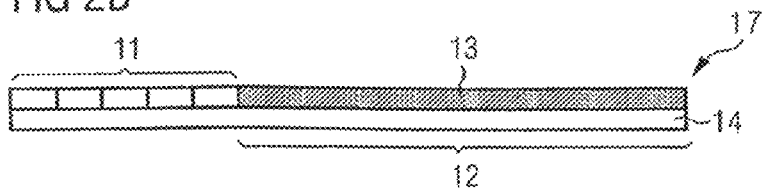
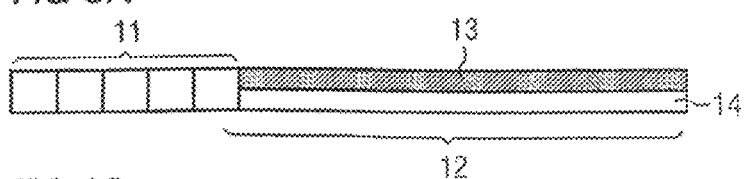
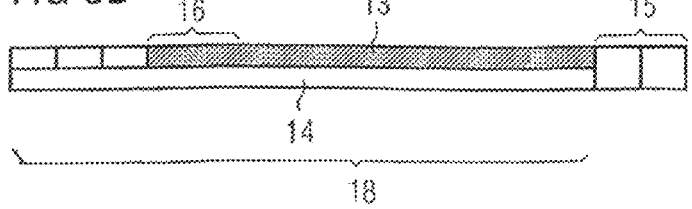

METHOD OF RE-TRANSMITTING AN ORIGINAL FRAME

CROSS REFERENCE TO RELATED APPLICATIONS

This application is based on and hereby claims priority to Great Britain Application No. 0508272.2 filed on Apr. 25, 2005, the contents of which are hereby incorporated by reference.

BACKGROUND

Described below is a method of retransmitting an original frame, in particular for enhanced uplink channel (E-DCH) for 3rd generation project partnership (3GPP) frequency division duplex (FDD).

Proposals have been made that in E-DCH retransmission of a data transmission for enhanced dedicated physical data channel (E-DPDCH), where at least one of the original transmission or the retransmission is in compressed mode, should be on the basis that the mapping of data to slots is unchanged, so that if a retransmission frame has more available slots than in the original transmission, no more of them are used than were used for the original transmission and the remaining slots are subject to discontinuous transmission (DTX).

It has also been assumed that the same method should be followed for retransmission of the enhanced dedicated physical control channel (E-DPCCH).

SUMMARY

Described below is a method of retransmitting an original frame by mapping data bits to a lower number of slots than the number of slots available for a retransmission frame; and transmitting control channels in all available slots of the retransmission frame, wherein the number of available slots in the retransmission frame is greater than the number of available slots in the original frame.

The data channel cannot use all available slots, but is limited to a lower number than the total number available. The control channel uses all available slots, so optimizing required transmit power and the resulting interference and coverage.

Data bits could be mapped to a different number of slots, for example if more slots are available in the retransmission frame, but preferably, the data bits are mapped to the same number of slots as in the original frame.

The position of each slot in the retransmission frame may change, relative to the original transmission frame, so that data bits are in different slot positions for the retransmission, but preferably, the position of each slot in a retransmission frame is the same as its position in the original frame.

Preferably, the method further includes adapting the control channel power per slot of the retransmission frame, such that the average control channel power per retransmission frame is substantially unchanged with respect to the average control channel power per original frame.

In the situation where the number of slots used in the original transmission and in the retransmission is the same, preferably, the method further includes adapting the data channel power per slot of the retransmission frame, such that the average data channel power per retransmission frame is substantially unchanged with respect to the average data channel power per original frame.

Alternatively, if the number of data slots in the retransmission frame is greater than in the original frame, then preferably the power per slot is substantially unchanged, rather than the average power.

In one example, the retransmission is in an uncompressed frame.

Alternatively, the retransmission is in a compressed frame.

Preferably, the data channel is enhanced dedicated physical data channel (E-DPDCH) and the control channel is enhanced dedicated physical control channel (E-DPCCH).

In addition, the control channel includes a dedicated physical control channel (DPCCH).

Although, different TTI's can be used, preferably, the frame has a transmission time interval (TTI) of 10 ms.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a data transmission diagram illustrating an example of a current method of handling retransmission of data using E-DPDCH;

FIG. 2 is a data transmission diagram illustrating a first example of a method of retransmitting a frame described below; and, FIG. 3 is a data transmission diagram illustrating a second example of the method described below.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In known methods, if an initial transmission overlaps with a compressed frame the user equipment (UE), such as a mobile phone or laptop, calculates a power reduction, P to be used in enhanced transport format combination (E-TFC) selection in conjunction with the maximum power ratio granted by the Node B scheduler. The power reduction, P is related to the length of the compressed mode gap in the frame, i.e. $P=10 \log_{10}(15/n_1)$, where $n_1$ is the number of slots available for the initial transmission.

The E-TFC selection is otherwise done as if the frame is not to be compressed, but the UE uses $\Delta_{non-compressed,cf}$ [dB] =granted power offset [dB]−P [dB] as the maximum allowed power ratio.

The selection of spreading factor and rate matching are done considering the actual number of slots available for transmission and all the bits after rate matching are transmitted. The purpose of the operation above is to reduce the payload transmitted in a compressed mode (CM) frame by selecting a smaller transport block than would be used for a non-compressed frame in order to maintain approximately the same maximum transmitted power over the transmitted slots. Non-scheduled transmissions are not subject to any power ratio limitations imposed to the E-TFC selection process, so the puncturing limit may be exceeded in this case with rates above 384 kbps, but this is unlikely to cause a problem.

For this known example, if a retransmission occurs in a compressed frame regardless of whether the initial transmission was compressed or not, or if a retransmission occurs in a non-compressed frame if the initial transmission was compressed, then a retransmission frame is generated assuming $n_1$ slots (i.e. the spreading factor selection and rate matching are based on $n_1$ slots); and at least the slots that overlap with the CM gap in the retransmission are subject to discontinuous transmission (DTX). $n_2$ slots of coded bits for the retransmission are transmitted in the first available $n_2$ slots in the retransmission frame, where $n_2$=min($n_1$, number of slots available for the retransmission). If more than $n_1$ slots are available for the retransmission, the last $n_3$ available slots of the frame are subject to DTX, where $n_3$=(number of slots available for retransmission-$n_1$).

FIG. 1 shows an example of the operation for the case of a 7-slot compressed mode transmission gap in the initial transmission frame and a 4-slot compressed mode transmission gap in the retransmission frame. The frame length, or TTI, may vary, but for 3GPP FDD, it is typically 10 ms. For an initial transmission 1 a number of transmitted slots 2, $n_1$, are provided followed by a slot transmission gap 3. For this example $n_1$=8 and the gap is 7 slots long. In a retransmission 4 there are 15 slots in total in the frame of which 4 have been defined as a compressed mode transmission gap 5 and the number of transmitted slots $n_2$=min ($n_1$, 11)=8. These eight slots 6, 7 are distributed around the gap 5. The remaining slots 8 are calculated as $n_3$=11-$n_1$=3 and these slots are DTX slots because they are not required for data.

In a situation where all initial transmissions are compressed; where all retransmissions are compressed; or where all retransmissions of a compressed initial transmission are non-compressed, then the gain factor $\beta_{ed}$ of the E-DPDCH is scaled according to the formula below, $n_1$ being the number of available slots in the initial transmission.

$$\beta_{ed\_compressed} = \beta_{ed\_non-compressed} \cdot \sqrt{\frac{15}{n_1} \cdot \frac{N_{pilot,C}}{N_{pilot,N}}}$$

where:

$$\beta_{ed\_non-compressed} = 10^{\left(\frac{\Delta_{non-compressed,cf}}{20}\right)}$$

$N_{pilot,C}$ is the number of DPCCH pilot bits per slot in the current frame (regardless of whether it is an initial transmission or a retransmission) and $N_{pilot,N}$ is the number of DPCCH pilot bits per slot in non-compressed frames.

The factor $$\sqrt{\frac{N_{pilot,C}}{N_{pilot,N}}}$$

simply avoids the E-DPDCH power being increased by the offset that is applied to the DPCCH to keep the pilot energy per slot constant when the DPCCH slot format is changed between compressed and non-compressed frames. This has nothing to do with the number of transmitted slots per frame.

For E-DCH there are two sub channels; a control channel (E-DPCCH) and a data channel (E-DPDCH). In addition, a further control channel (DPCCH) has to accompany all E-DPDCH transmissions. As illustrated by FIG. 1, in a known operation, a transmission time interval (TTI) consists of 15 timeslots. The E-DPCCH signalling formation includes a retransmission sequence number and an enhanced transport format combination indicator (E-TFCI) which are 3 timeslots in length and repeated 5 times. The E-DPDCH is mapped to all 15 timeslots.

In compressed mode, the user equipment (UE) transmitter is turned off for a portion of the timeslots, known as discontinuous transmission (DTX). In this case, the E-DPCCH is transmitted in the remaining timeslots with increased power. The E-DPDCH is mapped to the remaining timeslots.

An integral part of the E-DCH operation is hybrid automatic repeat request (HARQ). If the Node B has not properly received an uplink transmission, it may request a retransmission. For the "chase combining" mode of retransmission, i.e. retransmitting the same data more than once, the retransmission must have the same form and mapping of bits as the first transmission and only the position of transmitted slots within the retransmission frame can be different. In the case where the first transmission was made in a compressed mode frame; the data will have been mapped to a reduced number of slots. If a retransmission is made in a frame that is not in compressed mode, the mapping of bits to slots for the first transmission cannot be altered. Therefore in slots that were in DTX during the first transmission, the E-DPDCH is not transmitted in a retransmission.

In order to minimize transmit power required for E-DPCCH, the E-DPCCH should be transmitted in any available slots. Thus, if retransmissions for E-DCH contain more non DTX slots than the first transmission, then the E-DPDCH is only transmitted using the same number of slots as in the first transmission and TX power is kept the same as the first transmission, but the E-DPCCH is transmitted using all of the slots available in the second transmission and the TX power scaled according to the number of available slots; and the DPCCH is transmitted in all available slots FIG. 2 illustrates one example of the method. In FIG. 2*a*, a frame 10 is to be transmitted in compressed mode, so from the total number of time slots in the frame, a proportion of slots 11 are DTX. In the remaining slots 12 both the E-DPDCH 13 and the E-DPCCH 14 are transmitted for the first transmission. However, a retransmission 17 is required as shown in FIG. 2*b*, but this retransmission is not compressed. In this case, the E-DPDCH 13 is still limited to those slots 12 which were not DTX in the original transmission. However, E-DPCCH is not so constrained and retransmits in all available time slots 11, 12 of the second transmission.

FIG. 3 illustrates another example of the method. The first transmission, FIG. 3*a*, has the same arrangement as with FIG. 2*a*, i.e. there are a number of DTX slots 11 due to the transmission being of a compressed mode frame. The E-DPDCH 13 and E-DPCCH 14 are both transmitted in the remaining slots 12. However, the retransmission in this example is also compressed, so some of the slots 15 are DTX. In order for the E-DPDCH to be transmitted using the same number of slots, the position of these must change, so the first 3 of the original DTX slots 11 are not used, but the last two slots 16 are used to compensate for the fact that the slots 15 are now DTX. Thus, E-DPDCH 13 is transmitted on the same number of slots, but in different actual slots from in the original frame, and E-DPCCH 14 is transmitted on more slots 18 and also different ones to avoid the DTX slots in the retransmission.

The method enables the UE to transmit in a different numbers of slots with different relative power levels for DPCCH/E-DPCCH and E-DPDCH in compressed mode.

In a specific example for 3GPP FDD, using compressed frames in the uplink (UL) and where E-DCH TTI length is 2 ms, transmission gaps on the DPCH(s) due to compressed mode are handled by higher layer scheduling and the UE does not transmit E-DCH data in a TTI which fully or partly overlaps with an uplink transmission gap.

For an E-DCH TTI length of 10 ms, the parameters $n_{first}$ and $n_{last}$ are used to determine the transmission gap due to uplink compressed mode in the current radio frame. If the start of the transmission gap is allocated in the current frame $n_{first}=N_{first}$ else $n_{first}=0$. If the end of a transmission gap is allocated in the current frame $n_{last}=N_{last}$ else $n_{last}=14$.

If an initial transmission overlaps with a compressed frame the starting slot of the consecutive idle slots within the E-DCH TTI is $n_{first}$ and $n_{last}$ is the final idle slot within the 10 ms E-DCH TTI. The number of transmitted slots $n_{tx}$ is given by $n_{tx}=14+n_{first}-n_{last}$. If the initial transmission occurs in a non-compressed frame $n_{tx}=15$.

If a retransmission occurs in a compressed frame the maximum number of slots available for the retransmission is given by $n_{max}=14+n_{first}-n_{last}$. Otherwise, the maximum number of slots available for the retransmission $n_{max}$ is 15.

If the initial transmission was compressed and in the retransmission more than $n_{tx}$ slots are available for transmission ($n_{max}>n_{tx}$), the last $n_{dtx}=n_{max}-n_{tx}$ available slots of the E-DPDCH frame are idle slots. The E-DPDCH transmission gap when a retransmission occurs in a compressed frame or a retransmission occurs in a non-compressed frame, if the initial transmission was compressed, is defined as follows:

If $n_{max} \leq n_{tx}$

Idle slots are slots $n_{first}, n_{first}+1, \ldots, n_{last}$

If $n_{max} > n_{tx}$

If $n_{last} = 14$

Idle slots are the slots $n_{fist}-n_{dtx}, n_{first}-n_{dtx}+1, \ldots, n_{last}$ Else if $15-n_{dtx} > n_{last}$ Idle Slots are the slots $n_{first}, n_{first}+1, \ldots, n_{last}$ and $15-n_{dtx}, \ldots, 14$ Else Idle Slots are the slots $n_{first}-n_{last}-n_{dtx}+14$, $n_{fist}-n_{last}-n_{dtx}+15, \ldots, 14$ As applied in the specific examples, the method allows for chase combining during hybrid automatic repeat request (HARQ) retransmissions for a data channel, (in this case E-DPDCH), whilst optimizing the required transmit power and hence the resulting interference and also coverage for the associated control channels (E-DPCCH/DPCCH). The method relies on transmitting the E-DPDCH using the same number of slots as in the first transmission, whilst transmitting the associated control channels (E-DPCCH/DPCCH) using all available slots in the retransmission and scaling the power appropriately.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of retransmitting an original frame comprising:
    determining whether a retransmission frame is transmitted in a compressed mode;
    mapping data bits to a lower number of slots in the retransmission frame compared with the original frame when the retransmission frame is transmitted in the compressed mode; and
    mapping bits of control channels in all available slots of the retransmission frame when the retransmission frame is transmitted in the compressed mode, the control channels being associated with the data bits,
    wherein the retransmitting being executed when a number of the available slots in the retransmission frame is greater than a number of available slots of the original frame in the compressed mode.

2. A method according to claim 1, wherein the data bits in the retransmission frame are mapped to a same number of slots as in the original frame, and a position of the slots within the retransmission frame may vary according to a position of the slots in the original frame.

3. A method according to claim 1, wherein the data bits are mapped to the same slot in the retransmission frame as in the original frame.

4. A method according to claim 1, comprising
    adapting control channel power per slot of the retransmission frame, such that an average control channel power per retransmission frame is substantially unchanged with respect to an average control channel power per original frame.

5. A method according to claim 1, comprising
    adapting data channel power per slot of the retransmission frame, such that an average data channel power for the retransmission frame is substantially unchanged with respect to an average data channel power for the original frame.

6. A method according to claim 1, wherein the retransmission frame is an uncompressed frame.

7. A method according to claim 1, wherein the retransmission frame is a compressed frame.

8. A method according to claim 1, wherein the data channel is an enhanced dedicated physical data channel.

9. A method according to claim 1, wherein the control channel is an enhanced dedicated physical control channel.

10. A method according to claim 1, wherein the control channel is a dedicated physical control channel.

11. A method according to claim 1, wherein the retransmission frame has a transmission time interval of 10 ms.

12. An apparatus adapted to retransmit data bits of an original frame, the apparatus adapted to execute a process comprising:
    determining whether a retransmission frame is transmitted in a compressed mode;
    retransmitting of the data bits being executed when a number of available slots in the retransmission frame is greater than a number of available slots of the original frame in a compressed mode, the retransmitting including:
        mapping data bits to a lower number of slots in the retransmission frame compared with the original frame when the retransmission frame is transmitted in the compressed mode; and
        mapping bits of control channels in all the available slots of the retransmission frame when the retransmission frame is transmitted in the compressed mode, the control channels being associated with the data bits.

13. The apparatus of claim 12, wherein the apparatus is a user equipment.

14. The apparatus of claim 12, wherein the apparatus is a Node B.

* * * * *